(12) United States Patent
Park et al.

(10) Patent No.: US 10,393,497 B2
(45) Date of Patent: Aug. 27, 2019

(54) LENGTH MEASURING DEVICE

(71) Applicant: BAGEL LABS CO., LTD., Seongnam-si, Gyeonggi-do (KR)

(72) Inventors: Soo-Hong Park, Seoul (KR); Myung Jong Kim, Seoul (KR); Jun Young Park, Yongin-si (KR)

(73) Assignee: BAGEL LABS CO., LTD., Seongnam-si, Gyeonggi-do (KR)

(*) Notice: Subject to any disclaimer, the term of this patent is extended or adjusted under 35 U.S.C. 154(b) by 172 days.

(21) Appl. No.: 15/680,675

(22) Filed: Aug. 18, 2017

(65) Prior Publication Data
US 2018/0120080 A1    May 3, 2018

(30) Foreign Application Priority Data

Oct. 31, 2016 (KR) .................. 10-2016-0143744
Nov. 14, 2016 (KR) .................. 10-2016-0151342

(51) Int. Cl.
*G01B 3/12* (2006.01)
*G01B 7/02* (2006.01)
*G01B 3/10* (2006.01)
*G01D 5/12* (2006.01)

(52) U.S. Cl.
CPC .......... *G01B 7/026* (2013.01); *G01B 3/1084* (2013.01); *G01B 3/12* (2013.01); *G01B 3/1056* (2013.01); *G01B 3/1061* (2013.01); *G01B 2003/1053* (2013.01); *G01B 2003/1069* (2013.01); *G01D 5/12* (2013.01)

(58) Field of Classification Search
CPC ........................................... G01B 3/12
USPC ............................. 33/708, 772–782
See application file for complete search history.

(56) References Cited

U.S. PATENT DOCUMENTS

| | | | | |
|---|---|---|---|---|
| 3,494,039 | A * | 2/1970 | Porter | G01B 3/12 33/773 |
| 5,943,785 | A * | 8/1999 | Kondo | G01D 5/34723 33/773 |
| 6,640,451 | B1 * | 11/2003 | Vinarcik | F02P 7/0675 29/595 |
| 2004/0128851 | A1 * | 7/2004 | Brown | G01B 3/12 33/772 |
| 2008/0082119 | A1 * | 4/2008 | Vitullo | G01B 3/12 606/192 |
| 2014/0317944 | A1 * | 10/2014 | Kumagai | G01C 5/00 33/773 |
| 2017/0082414 | A1 * | 3/2017 | Thorp | G01B 3/12 |
| 2017/0370687 | A1 * | 12/2017 | Lai | G01B 3/004 |
| 2018/0073848 | A1 * | 3/2018 | Wang | G01B 3/12 |
| 2018/0340761 | A1 * | 11/2018 | Chen | G01B 3/12 |

* cited by examiner

*Primary Examiner* — George B Bennett
(74) *Attorney, Agent, or Firm* — Rabin & Berdo, P.C.

(57) ABSTRACT

A length measuring device is provided, which includes a case, a first rotating part configured to rotate while a portion of a circumference thereof exposed outside the case is in contact with a measured object, a rotation interfering part configured to interfere with an inertial rotation of the first rotating part, and a control part configured to calculate a length measurement using an amount of rotation of the first rotating part.

20 Claims, 13 Drawing Sheets

LENGTH MEASURING DEVICE

FIELD

The present disclosure relates to a length measuring device, and more particularly, to a length measuring device capable of measuring both the straight lengths and the curved lengths of a measured object.

BACKGROUND

Generally, a measuring tape having a tape configuration with length-indicating markings formed on a surface thereof is used for measuring widths or breadths of a certain space, or for measuring sizes, lengths or widths of a measured object.

While there are several forms of measuring tapes available, a typical example will be a measuring tape that includes a ruler wound in a coil shape with markings formed on a surface, an inner space for accommodating the ruler, and a case having an entrance through which the ruler is extended out of the inner space and retracted back into the inner space. In order to measure a length of the measured object, an operator pulls out the ruler with markings indicated thereon and read the markings on one end and a body portion of the ruler when the ruler reaches an end of the measured object.

However, while the conventional measuring tape is capable of measuring straight lengths of a measured object, it has a difficulty of measuring circumference of a cylinder or curved lengths as it is not in a freely bendable form.

Another conventional measuring tape is freely bendable and thus capable of measuring both the straight lengths and the curved lengths. However, this type of measuring tape is not able to measure a long length accurately because the tape bends when measuring the long length.

Moreover, because an operator of the conventional measuring tape manually measures lengths and checks the measurements himself or herself, errors may be generated depending on operators, and the operator has inconvenience of having to measure the lengths and then record the measured numbers with handwriting or separate typewriting.

Meanwhile, an electronic tape measure has been developed, which electronically measures the length of the ruler extended outside. This electronic measuring tape uses a method of forming holes in the tape or a rotator and irradiating a laser to sense a degree of extension of the tape (i.e., photo interrupter). However, the photo-interrupter method described above is not suitable for use in a place such as construction site where dusts are prevalent, and there also is a problem that the length measuring resolution is limited to intervals between the holes.

SUMMARY

Accordingly a technical objective of the present disclosure is to provide a length measuring device capable of measuring both the straight lengths and the curved lengths of a measured object.

According to an exemplary embodiment of the present disclosure, a length measuring device is provided, which may include: a case; a first rotating part configured to rotate while a portion of a circumference thereof exposed outside the case is in contact with the measured object; a rotation interfering part configured to interfere with the inertial rotation of the first rotating part; and a control part configured to calculate a length measurement using an amount of rotation of the first rotating part.

The first rotating part may include a rotator, wherein the rotator comprises: a groove formed in an end of the rotator to receive the rotation interfering part; and a bump formed on an inner wall of the groove, and the rotation interfering part may include one or more interfering protrusions configured to contact the bump formed on the inner wall of the groove to interfere with the inertial rotation of the rotating part.

The bump formed on the inner wall of the groove may have a serrated structure and may be formed of an elastic material.

A projecting part having a magnet insertion groove to receive a magnet therein may be formed in an end of the rotator.

The groove may be formed along a circumference of the projecting part.

The interfering protrusions may be formed on a side surface of the rotation interfering part.

A hole may be formed at a center of the rotation interfering part so that the magnet and the projecting part do not contact the rotation interfering part.

The length measuring device described above may further include: a rotating drum part, along which a string is wound a plurality of times, and which is rotated as the string is retracted or extended into or out of an outlet formed in the case; a second rotating part of which a circumference is in contact with the string, and which rotates in accordance with the retracting or extension of the string; and a guiding part for guiding the string to be retracted or extended while a portion of the string is in contact with the circumference of the second rotating part.

The guiding part may include a plurality of pins for bringing a portion of the string into a close contact with the circumference of the second rotating part.

The plurality of pins may be spaced apart from the second rotating part.

The string may be passed between the second rotating part and the plurality of pins.

The plurality of pins may include a first pin and a second pin.

The first pin, a center of the second rotating part, and the second pin may form an obtuse angle.

The string may be brought into a contact with a portion of the circumference of the second rotating part at a direction opposite the obtuse angle.

The guiding part may further include a guide body including a second rotating part insert into which the second rotating part is rotatably inserted, and a plurality of pin inserts into which the plurality of pins are respectively inserted.

An upper portion of the guide body may be open to allow the second rotating part and the plurality of pins to be inserted into the guide body from above the guide body.

The length measuring device may further include a stopper coupled with the upper portion of the guide body so that the string received in the guide body is not separated through the upper portion of the guide body.

The case may include an upper case and a lower case.

The guide body may include a fitting coupler formed on a lower portion to be fit in the lower case.

The length measuring device may further include a first magnet fixed to an end of the second rotating part, a first magnetic encoder configured to calculate an amount of rotation of the second rotating part by detecting a change in a magnetic field generated by a rotation of the first magnet when the second rotating part is rotated according to extension or retraction of the string, and a controller configured to calculate a length measurement using the amount of rotation of the second rotating part.

The second rotating part may include a guiding groove formed in the circumference thereof to guide the string.

The guiding groove may include bumps formed along a circumference thereof.

The first magnet may have a cylindrical shape.

The first magnet may be a permanent magnet magnetized in one of perpendicular directions with respect to an axis of rotation of the second rotating part.

The length measuring device may further include a second magnet fixed to an end of the first rotating part, and a second magnetic encoder configured to calculate an amount of rotation of the first rotating part by detecting a change in a magnetic field that is generated by a rotation of the second magnet when the first rotating part is rotated.

The controller may calculate length measurement by using the amount of rotation of the second rotating part, or the amount of rotation of the first rotating part.

The length measuring device may further include a circuit board having the first magnetic encoder and the second magnetic encoder mounted thereon.

The rotating drum part, the second rotating part, and the first rotating part may be mounted on the lower case.

When the lower case and the circuit board are coupled, the first magnetic encoder and the second magnetic encoder may be disposed above the second rotating part and the first rotating part, respectively.

The length measuring device described above may further include a hook coupled to one end of the string.

The hook may include a first plate and a second plate.

The second plate may be connected to one end of the first plate at a predetermined angle.

The second plate may include an elongated groove formed in a direction extending from the first plate.

When the hook is fixed onto the measured object, a portion of the string may be inserted into the elongated groove and thus restricted in a movement thereof as much as the width and depth of the elongated groove.

One end of the string may be passed through a hole formed at a center of a connecting part between the first plate and the second plate and tied into a knot on the first plate.

According to the present disclosure, use of a measuring string is diversified so that it is able to measure not only the long straight lengths, but also the curved lengths of a plane and even the distances in a three-dimensional structure. Further, by fixing the hook in close contact with the measured object irrespective of the string, accuracy can be increased. Further, accuracy can still further be increased by preventing the rotating part from continuously rotating by inertia after rotating in the contact with the measured object, once the rotating part has been separated from the contact with the measured object.

Further, by using a magnetic encoder, it is possible to linearly measure a change in magnetic field according to a rotation of the magnet attached onto a rotator. Accordingly, compared to a traditional method of counting indicia formed discretely on a rotator, increased accuracy can be provided.

Further, by using a structure that guides a movement of the string along a predetermined path inside the case during extension or retraction of the string, increased accuracy of measurement can be provided.

DETAILED DESCRIPTION

Hereinbelow, the present disclosure will be described in detail with reference to the accompanied drawings to enable those skilled in the art to easily work the present disclosure.

Figure 1:
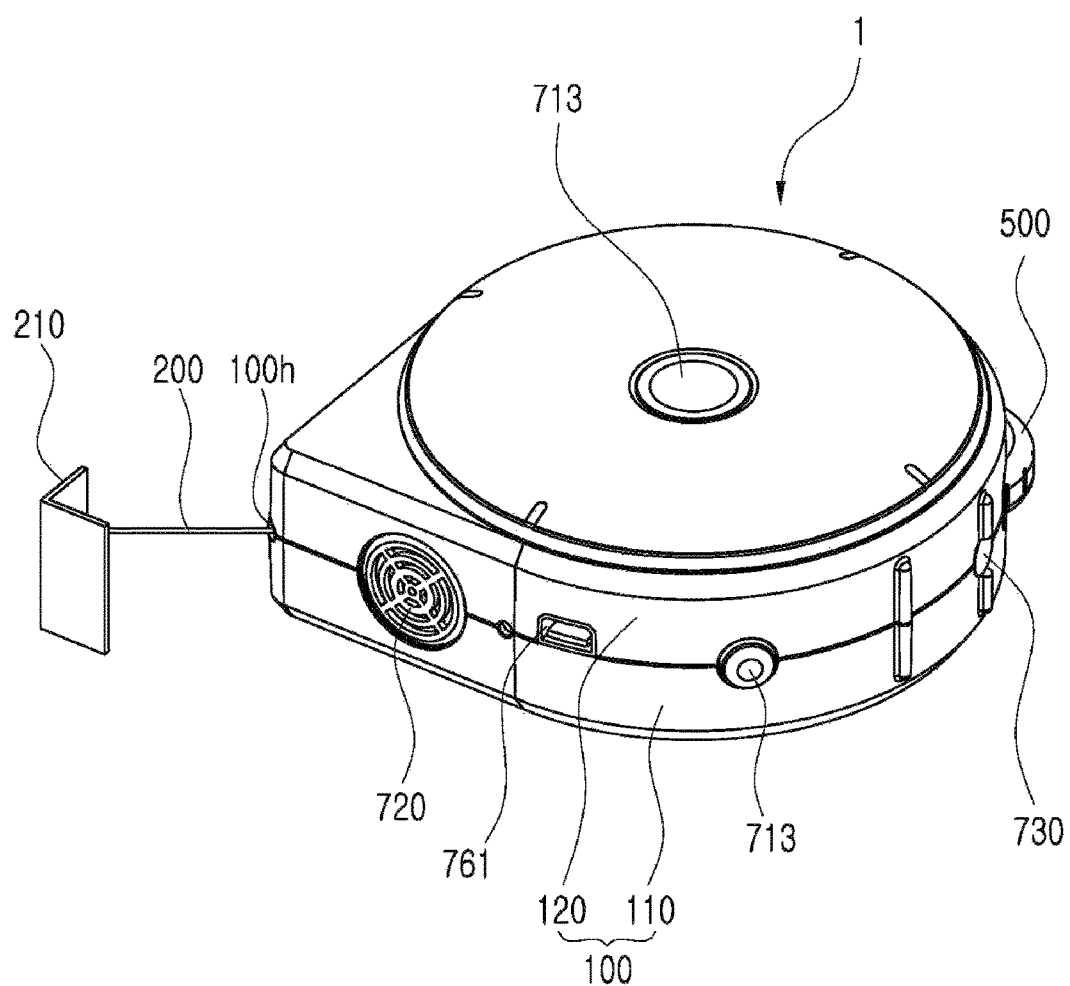
FIG. 1 is a schematic perspective view of a length measuring device according to an exemplary embodiment of the present disclosure.
Figure 2:
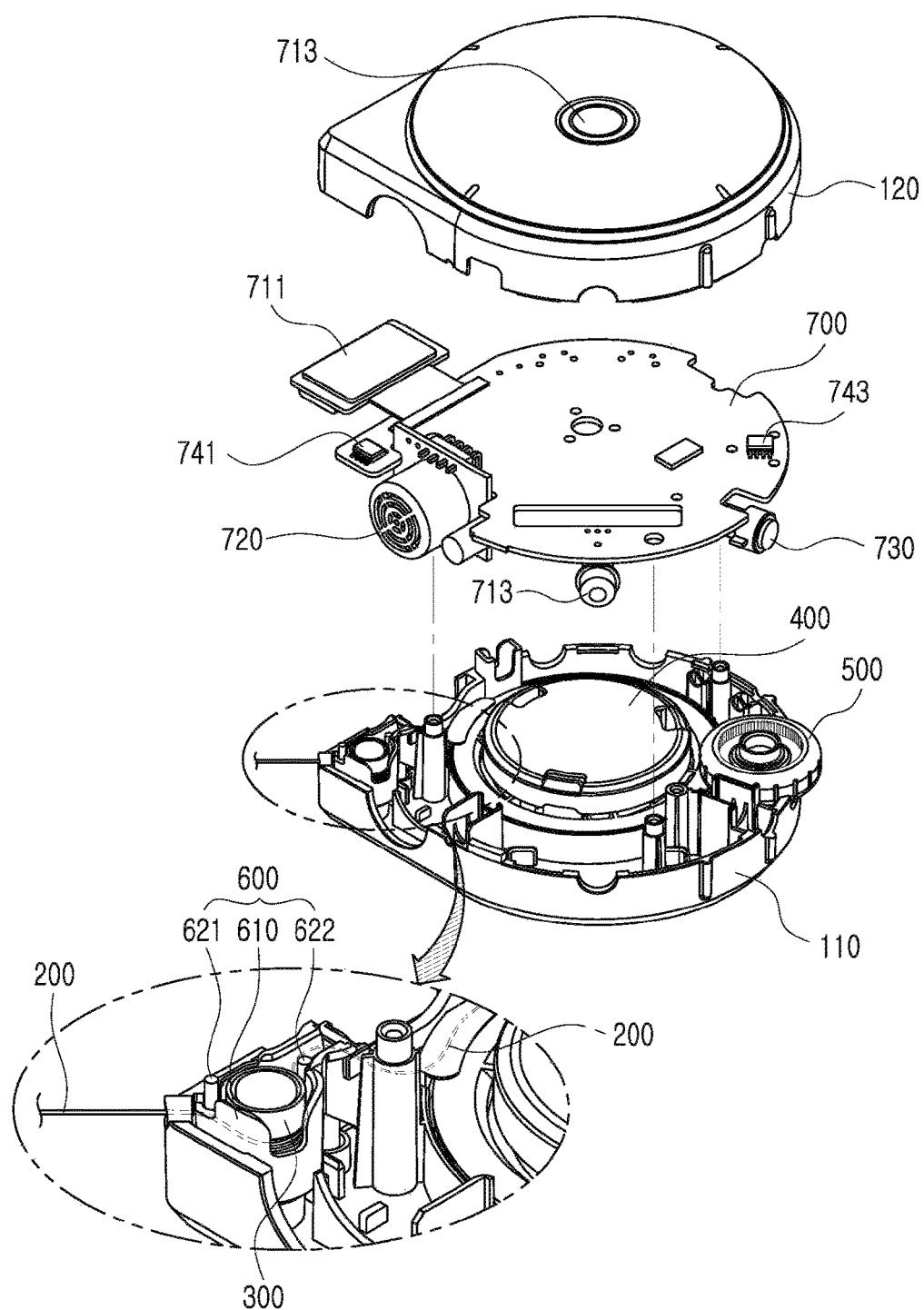
FIG. 2 is an exploded view of a length measuring device according to an exemplary embodiment of the present disclosure.

FIG. 1 is a schematic perspective view of a length measuring device according to an exemplary embodiment of the present disclosure, and FIG. 2 is an exploded view of a length measuring device according to an exemplary embodiment of the present disclosure.

Referring to FIGS. 1 and 2, the length measuring device 1 according to an exemplary embodiment may provide at least one of a string measuring mode, a wheel measuring mode, and a contactless measuring mode.

In the string measuring mode, the length measuring device 1 may obtain a length measurement by calculating an extent by which the string 200 is extended out of the case 100 through an entrance 100*h*.

In the wheel measuring mode, the length measuring device 1 may obtain a length measurement based on an amount of rotation of a first rotating part 500

In the contactless measuring mode, the length measuring device 1 may obtain a length measurement based on a time duration between generating of laser, infrared light, ultrasound, and so on at the non-contact measuring portion 720 and receiving of the reflected laser, infrared light, ultrasound, and so on returned from the measured object.

The length measuring device 1 may include a case 100, a string 200, a second rotating part 300, a rotating drum part 400, a first rotating part 500, a guiding part 600, and a circuit board 700.

The case 100 may be composed of a lower case 110 and an upper case 120. The lower case 110 and the upper case 120 may be coupled with each other to receive respective elements of the length measuring device 1 and protect them therein.

The string 200 may also be realized in a form of a strip, a tape, and so on.

One end of the string 200 may be coupled to a hook part 210. Further, the other end of the string 200 may be attached onto the rotating drum part 400, and the string 200 may be wound a plurality of times. In addition, when the user pulls the hook part 210, the string 200 may be unwound from the rotating drum part 400 such that a portion of the string 200 may be extended out of the entrance 100h. On the other hand, when the user releases the hook part 210, the string 200 may be automatically rewound onto the rotating drum part 400, that is, the string 200 may be retracted from the extended position back into the case 100.

The movement of the string 200 may be guided by the guiding part 600 along a predetermined path inside the case 100. Further, the string 200 may be brought into contact with a circumference of the second rotating part 300 to thus rotate the second rotating part 300 during extension or retraction.

The second rotating part 300, the rotating drum part 400, the first rotating part 500, and the guiding part 600 may be mounted on the lower case 110. The second rotating part 300 rotatably mounted on the guiding part 600, may be mounted on the lower case 110.

Figure 3:
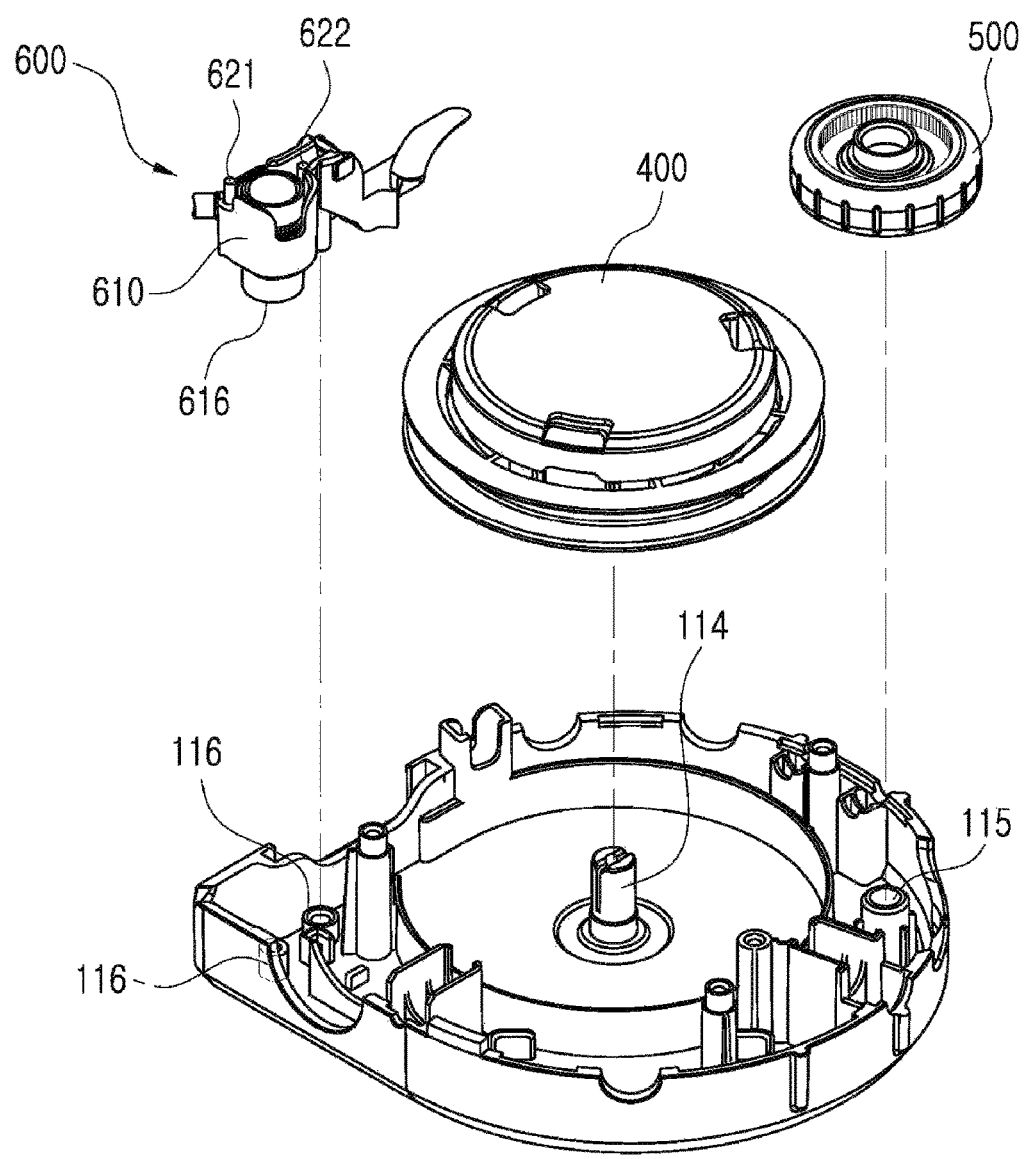
FIG. 3 is a view provided to explain a structure in which some of the elements of a length measuring device are mounted on a lower case according to an exemplary embodiment of the present disclosure.

FIG. 3 is a view provided to explain a structure in which some of the elements of a length measuring device are mounted on a lower case according to an exemplary embodiment of the present disclosure.

Referring to FIG. 3, the lower case 110 may also include a first shaft 114, a second shaft 115, and a fitting part 116. Further, the lower case 110 may be provided with a structure necessary for coupling the circuit board 700 and the upper case 120 to the lower case 110.

The rotating drum part 400 may be mounted to rotate about the first shaft 114 formed in the lower case 110 as an axis of rotation.

The first rotating part 500 may be mounted to rotate about the second shaft 115 formed in the lower case 110 as an axis of rotation.

The guiding part 600 may include a guide body 610, and a plurality of pins 621, 622. The guide body 610 may have a fitting coupler 616 formed on a lower portion. The fitting coupler 616 may have such a structure that it can be fit into a fitting part 116 formed on the lower case 110. For example, the fitting coupler 616 may be in a form of a protrusion and the fitting part 116 may be in a form of a hole to receive the protrusion to be fit therein. The guiding part 600 may be mounted on the lower case 110 as the fitting coupler 616 is fit into the fitting part 116. Of course, coupling methods other than fitting may be applied to fixedly couple the guiding part 600 to the lower case 110.

The rotating drum part 400 is wound with the string 200 a plurality of times such that when the string 200 is extended, the rotating drum part 400 may be rotated about the first shaft 200 as an axis of rotation in accordance with the extension of the string 200. Further, the rotating drum part 400 may have a recovery force to rotate in an opposite direction to a direction in which the string 200 is extended. Accordingly, when the force that pulls the hook part 210, that is, the tension exerted on the string 200 is less than the recovery force of the rotating drum part 400, the string 200 is automatically rewound by the rotating drum part 400 to be retracted back into the case 100.

Figure 4:
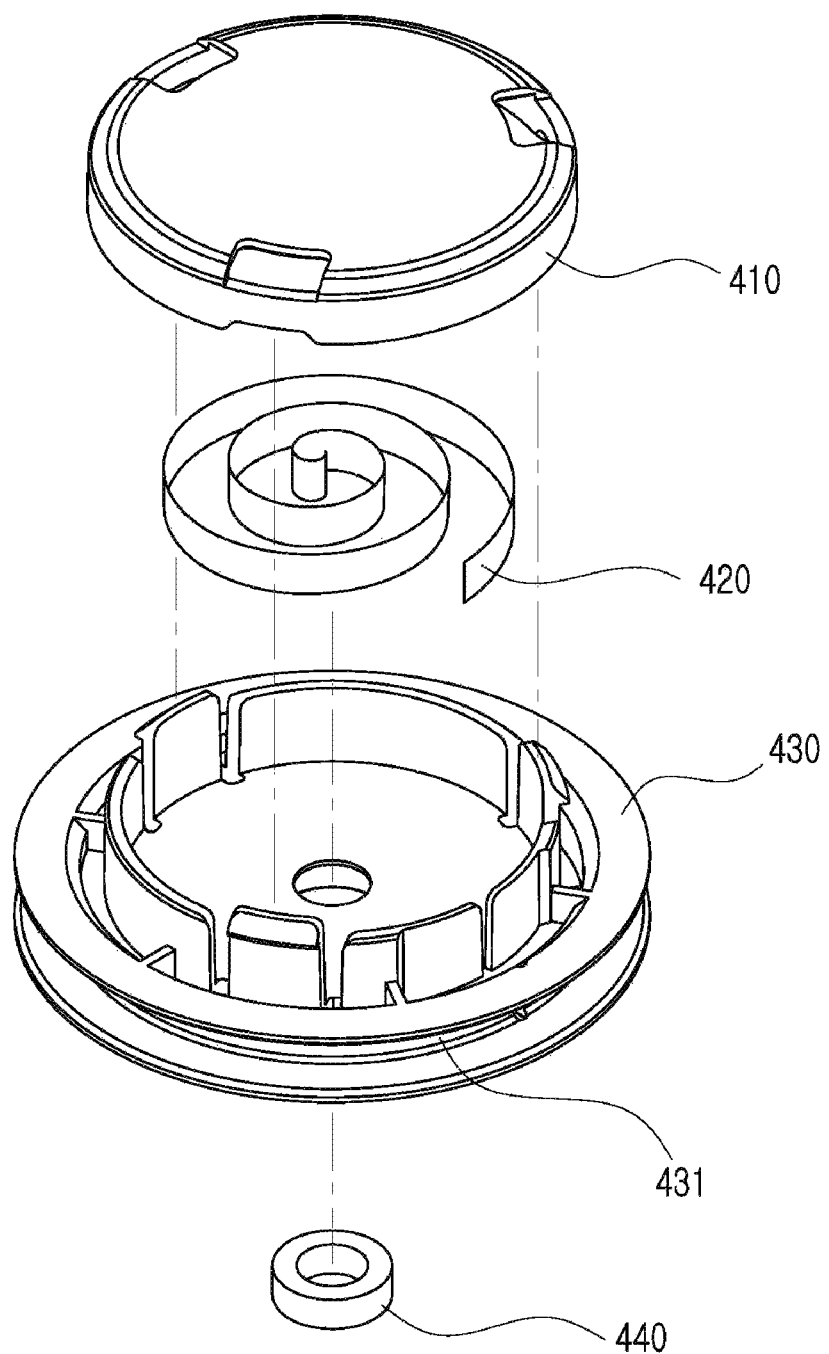
FIG. 4 is a view provided to explain a configuration of a rotating drum part according to an exemplary embodiment of the present disclosure.

FIG. 4 is a view provided to explain a configuration of a rotating drum part according to an exemplary embodiment of the present disclosure.

Referring to FIG. 4, the rotating drum part 400 may include a cover 410, an elastic member 420, and a rotating drum body 430.

The elastic member 420 may provide the rotating drum part 400 with a recovery force that causes it to rotate opposite to the direction string 200 is unwound. The elastic member 420 may employ a spiral spring, and so on.

The cover 410 performs a function of protecting the elastic member 420 mounted inside the rotational drum 430 and to protect the elastic member 420 so that the elastic member 420 is not separated from the rotating drum body 430. The elastic member 420 may be mounted in the rotating drum body 430, and then coupled with the rotating drum body 430.

The string 200 may be wound around a circumference 431 of the rotating drum body 430 a plurality of times.

A bearing 440 may be disposed between the rotating drum part 400 and the first shaft 200 to facilitate the rotation of the rotating drum part 400 about the first shaft 114 as an axis of rotation during winding or unwinding of the string onto or from the rotating drum part 400.

Referring back to FIG. 2, the guiding part 600 may include a guide body 610, and a plurality of pins 621, 622. The guiding part 600 may guide the string 200 so that the string 200 is moved along a path within a predetermined range inside the case 100. Specifically, the guiding part 600 may guide the string 200 such that the string 200 is extended or retracted while a portion of the string 200 remains in contact with the circumference of the second rotating part 300.

Figure 5:
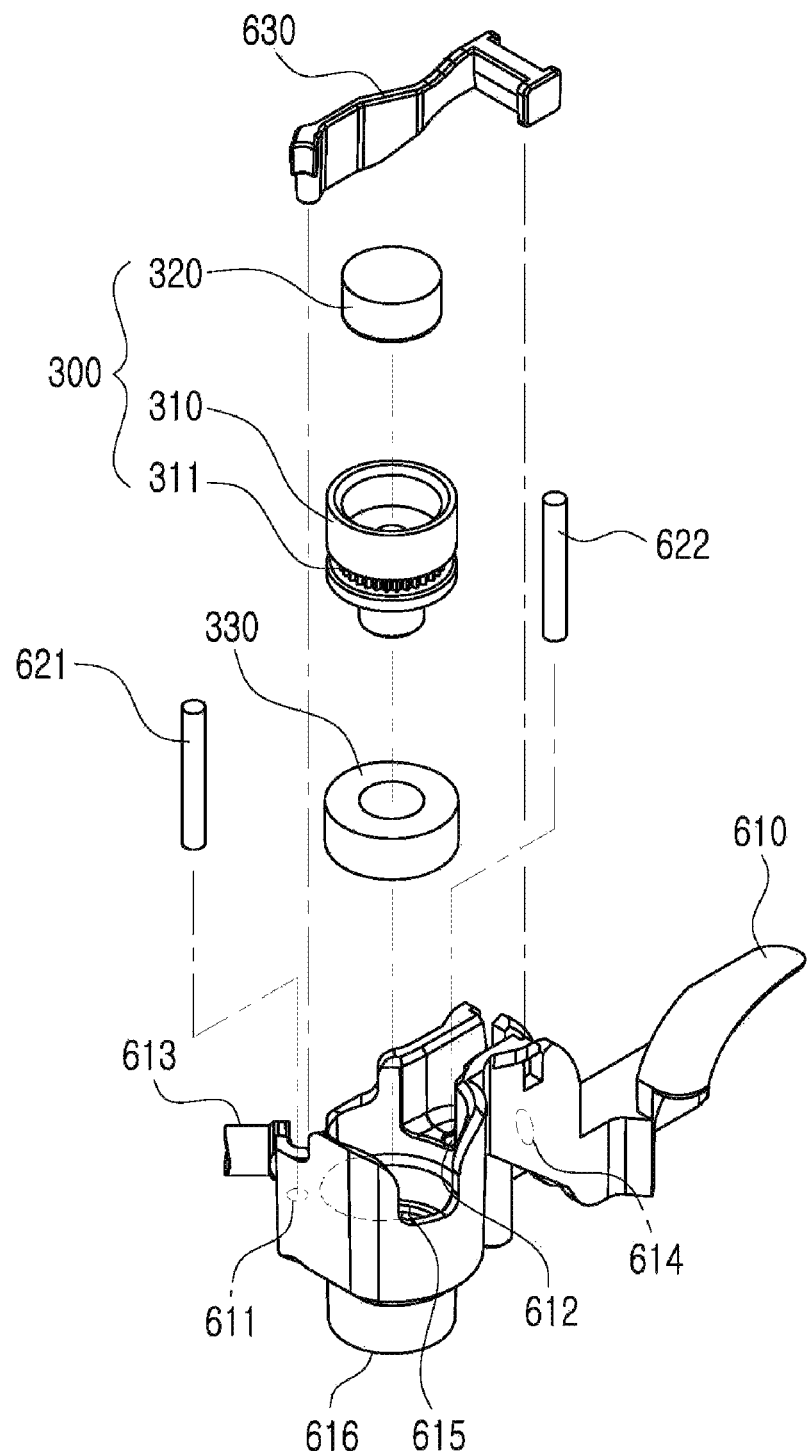
FIG. 5 is a view provided to explain a configuration of a second rotating part and a guiding part according to an exemplary embodiment of the present disclosure.

FIG. 5 is a view provided to explain a configuration of a second rotating part and a guiding part according to an exemplary embodiment of the present disclosure.

Referring to FIGS. 2 and 5, the second rotating part 300 may include a second rotator 310 and a magnet 320. The magnet 320 may be fixedly inserted into an end of the second rotator 310. Further, the second rotator 310 may include a guiding groove 311 with bumps formed along a circumference thereof. The guiding groove 311 plays a role of guiding the string 200 so that the string 200 is moved along a predetermined path on the circumference of the second rotator 310. Further, the bumps formed in the guiding groove 311 may enable the second rotator 310 to be rotated stably without being slipping when the string 200 is extended or retracted. As a result, the length by which the string 200 is extended and the amount of rotation of the second rotator 310 may exactly correspond to each other. Accordingly, the length measurement can be obtained based on the amount of rotation of the second rotator 310.

The magnet 320 may employ a cylindrical permanent magnet. Further, the magnet 320 may be magnetized in one of perpendicular directions with respect to the axis of rotation of the second rotator 310.

A bearing 330 may be disposed between the second rotating part 300 and the guiding part 610 to facilitate the rotation of the second rotating part 300 that is inserted in the guiding part 600.

The second rotating part 300 and a plurality of pins 621, 622 may be inserted into the guide body 610.

Figure 6:
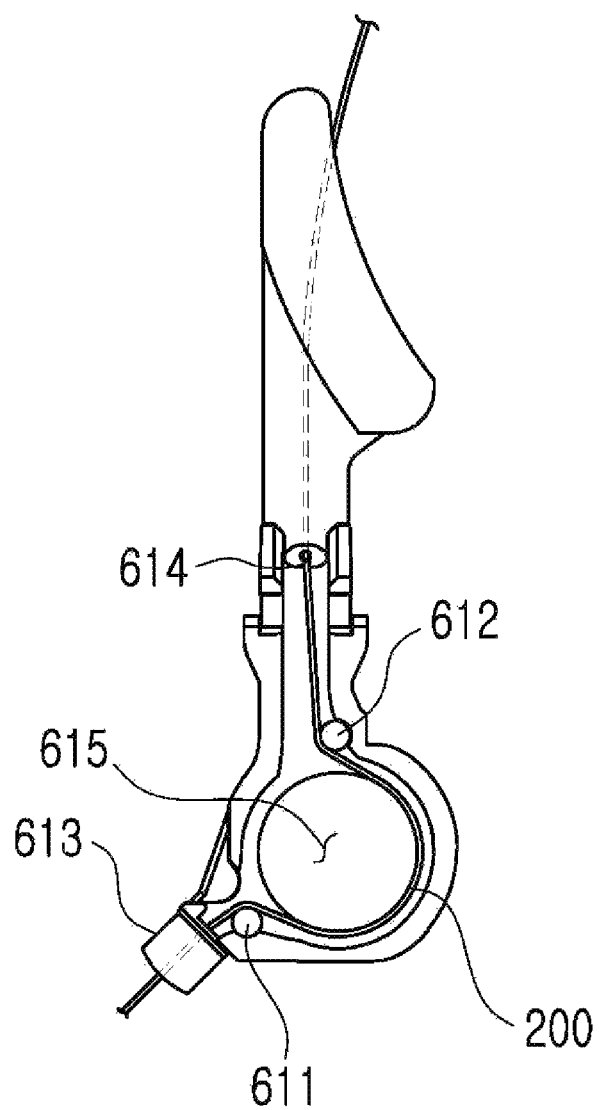
FIG. 6 illustrates a guide body viewed from above according to an exemplary embodiment of the present disclosure.

FIG. 6 illustrates a guide body viewed from above according to an exemplary embodiment of the present disclosure.

Referring to FIG. 6, the guide body 610 may include a plurality of pin inserts 611, 612, a second rotating part insert 615, a first opening 613, a second opening 614, and so on.

The second rotating part insert 615 may be in such a form that the second rotating part 300 can be rotatably inserted thereto. The second rotating part insert 615 may be formed on the guide body 610.

A plurality of pin inserts 611, 612 may be spaced apart from the second rotating part insert 615 by a predetermined distance, and may be formed such that a plurality of pins 621, 622 can be fixedly inserted thereto. As a result, the second rotating part 300 and a plurality of pins 621, 622 are inserted into the guide body 610, while being spaced apart from each other by a predetermined distance.

Inside the guide body 610, the string 200 may be moved along a path shown in FIG. 6. When unwound from the rotating drum part 400, the string 200 is passed through the second opening 614 and drawn into the guide body 610, and then passed through the first opening 613 and extended out of the guide body 610. The first and second openings 613, 614 may preferably have a hole size about two times as large as the diameter of the string 200, although the size may be varied according to exemplary embodiments.

The guide body 610 may preferably have a structure in which an upper portion is open. Accordingly, as illustrated in FIG. 5, the second rotating part 300 and a plurality of pins 621, 622 may be easily inserted into the guide body 610 from above the guide body 610.

Referring back to FIG. 5, the guiding part 600 may additionally include a stopper 630 coupled with an upper portion of the guide body to prevent the string 200 from separating from inside of the guide body 610 through the upper portion of the guide body.

A plurality of pins 621, 622, fixedly inserted into the pin inserts 611, 612, may be spaced apart from the second rotating part 300 by a predetermined distance, and may be disposed in the guide body 610 such that the first pin 621, the center of the second rotating part 300, and the second pin 622 are formed at an obtuse angle.

The portion of the circumference of the second rotating part 300, which is in contact with the string 200, may be a portion in an opposite direction to the obtuse angle formed by the first pin 621, the center of the second rotating part 300, and the second pin 622. As a result, a plurality of pins 621, 622 may keep the string 200 in the guide body 610 in tight contact with the circumference of the second rotating part 300, while preventing contact with the guide body 610 or allowing only a minimum contact. The configuration described above may suppress wear of the string 200 particularly in an example where the guide body 610 is formed from a material such as plastic, and so on.

Meanwhile, in an exemplary embodiment, an additional pin may be disposed at a portion opposite the obtuse angle formed by the first pin 621, the center of the second rotating part 300, and the second pin 622, to be inserted into the guide body 610 while being spaced apart from the second rotating part 300.

The string, which was wound around the rotating drum part 400, may be moved by the guiding part 600 along the path to be described below, to thus be extended out of the entrance 110h. The string 200 is entered into the guide body 610 through the second opening 614, and then passed between the second rotating part 300 and the first pin 621. The string 200 in contact with the circumference of the second rotating part 300 may then be moved, while rotating the second rotating part 300 with frictional force. Next, the string 200 is passed between the second rotating part 300 and the pin 621, and extended out of the case 100 through the first opening 613. Meanwhile, when retracted, the string 200 is moved along the corresponding path in a direction opposite the extension direction, and rewound around the rotating drum portion 400.

The first opening 613 may have a shape that can be inserted into the outlet 100h formed in the case 100.

Figure 7:
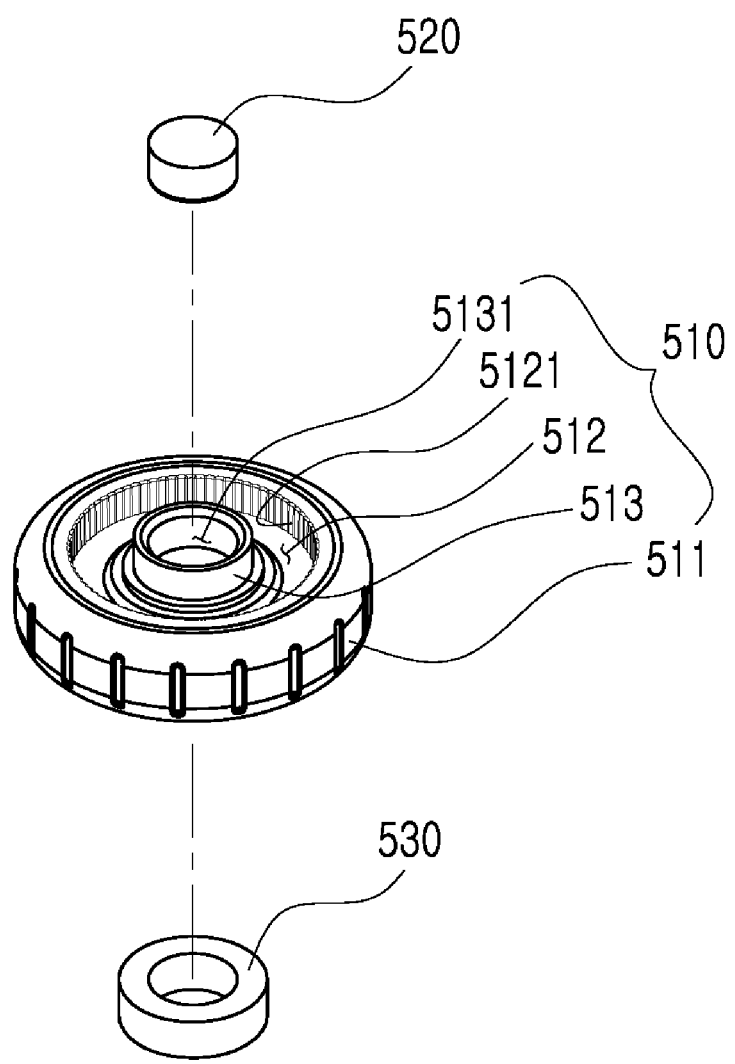
FIG. 7 is a view provided to explain a configuration of a first rotating part according to an exemplary embodiment of the present disclosure.

FIG. 7 is a view provided to explain a configuration of a first rotating part according to an exemplary embodiment of the present disclosure.

Referring to FIGS. 3 and 7, the first rotating part 500 may include a first rotator 510, and a magnet 520.

The magnet 520 may be fixedly inserted into an end of the first rotator 510.

The circumference 511 of the first rotator 510 may be formed of an elastic polymer material such as rubber, silicone, and so on so as to increase the grip force with the measured object.

A projecting part 513 having a magnet insertion groove 5131 may be formed in an end of the first rotator 510. The magnet 520 may be inserted and fixed in the magnet insertion groove 5131 and rotate about the same axis of rotation as the first rotator 510.

The first rotator 510 may have a groove 512 formed in an end of the first rotator 510 to receive a rotation interfering part (not illustrated). The groove 512 may extend along a circumference of the projecting part 513. A bump in a serrated structure may be formed on an inner wall 5121 of the groove 512. The bump formed on the inner wall 5121 of the groove 512 may also be formed of an elastic polymer material such as rubber, silicone, and so on.

The rotation interfering part may be received in the groove 512 to interfere with the inertial rotation of the first rotating part 500. The rotation interfering part will be described in greater detail below.

A bearing 530 is disposed between the first rotating part 500 and the second shaft 115 to facilitate the rotation of the second 115 about the axis of rotation when the first rotating part is rotated in contact with the measured object.

Figure 8:
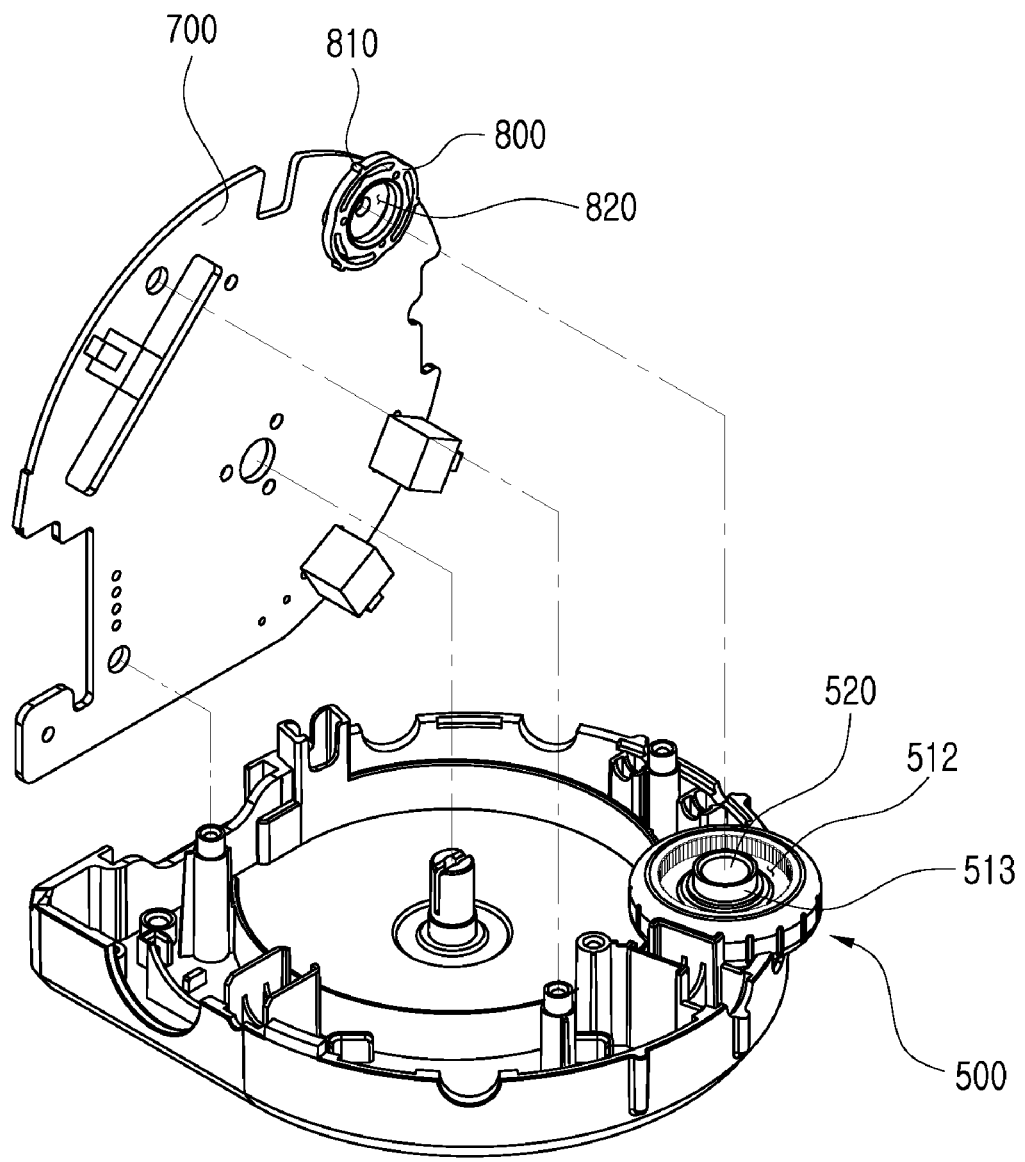
FIG. 8 is a view provided to explain a configuration of a rotation interfering part and a first rotating part according to an exemplary embodiment of the present disclosure.

FIG. 8 is a view provided to explain a configuration of the rotation interfering part and the first rotating part according to an exemplary embodiment of the present disclosure.

Referring to FIG. 8, the rotation interfering part 800 may be provided with one or more interfering protrusions 810. In addition, the rotation interfering part 800 may be mounted on a lower portion of the circuit board 700 such that, when the length measuring device 1 is assembled, the rotation interfering part 800 is positioned under a second magnetic encoder 743 (see FIG. 2) mounted on an upper portion of the circuit board 700 and received in the groove 512 of the first rotating part 500.

With the rotation interfering part 800 being received in the groove 800, the interfering protrusion 810 may come into contact with the bump formed in the serrated structure on the inner wall 5121 of the groove 512 to interfere with the inertial rotation of the first rotating part 500. While FIG. 8 illustrates three interfering protrusions 810 formed on a side surface of the rotation interfering part 800, the number of the interfering protrusions may vary depending on embodiments.

Meanwhile, with the rotation interfering part 800 being received in the groove 512, the projection 513 and the magnet 520 of the first rotating part 500 may be contactlessly received in the hole 820 formed at a center of the rotation interfering part 800.

The structure described above interferes with the first rotating part 500 and thus enables the first rotating part to stop rotating by inertia, when the first rotating part is separated from the position at which it is rotated in contact with the measured object. Accordingly, accurate length measurement can be obtained based on the extent by which the first rotating part 500 is rotated in contact with the measured object.

Figure 9:
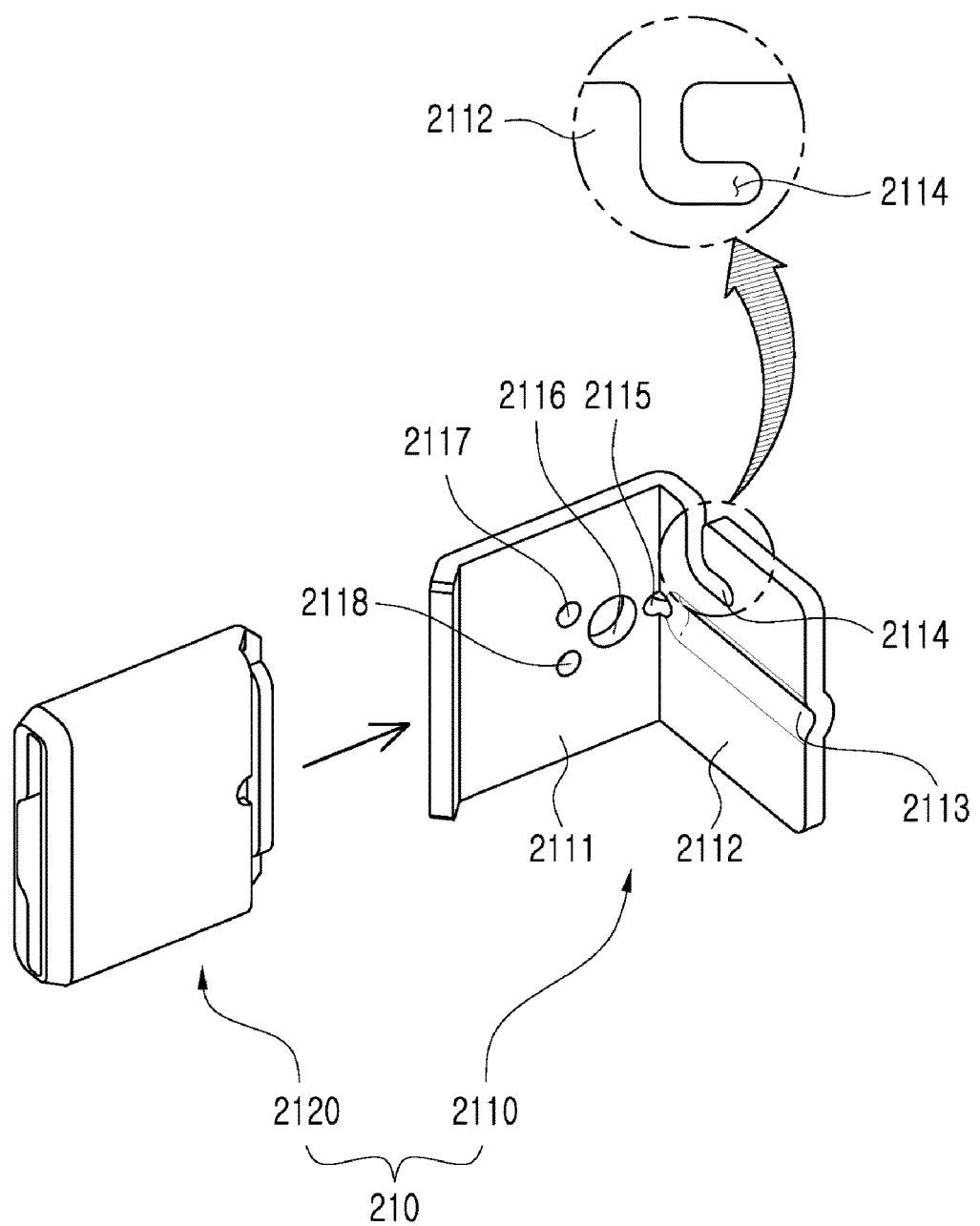
FIG. 9 is a view provided to explain a detailed configuration of a hook according to an exemplary embodiment of the present disclosure.

FIG. 9 is a view provided to explain a detailed configuration of the hook part according to an exemplary embodiment of the present disclosure.

Referring to FIG. 9, the hook part 210 may include a hook 2110 and a hook cover 2120.

The hook 2110 may include a first plate 2111 and a second plate 2112. The first plate 2111 and the second plate 2112 may be connected to each other at a predetermined angle, e.g., 90 degrees, and the angle is adjustable.

The second plate 2112 may be provided with an elongated groove 2113 formed in a direction extending from the first plate 2111. The elongated groove 2113 may be formed perpendicularly to a connecting part between the first plate 2111 and the second plate 2112. The elongated groove 2113 may be formed with the width and the depth which may be practically identical to, or slightly greater than the diameter of the string 200.

Accordingly, when the hook part 210 is fixed onto the measured object, a portion of the string 200 may be inserted into the elongated groove 2113 where the movement of the string is restricted as much as the width and the depth of the elongated groove 2113. Further, a portion of the string 200 may be entirely inserted into the elongated groove 2113 and thus kept in close contact with the measured object of the second plate 2112.

The second plate 2112 may have a locking groove 2114 at which the string 200 can be locked after winding a circumference of the measured object one time. The locking groove 2114 may be used when measuring the circumference of the measured object. For example, the operator may easily measure his or her waistline on his or her own, by using the locking groove 2114.

The connecting part between the first plate 2111 and the second plate 2112 may have a hole 2115. Further, the first plate 2111 may have a plurality of holes 2116, 2117, 2118. The plurality of holes 2116, 2117, 2118 are provided to couple one end of the string 200 to the hook 2110, and the number or position of the holes formed in the first plate 2111 may vary. Further, a groove may be formed in a side surface of the first plate 2111 as a replacement for the hole for a knot of the string.

Figure 10:
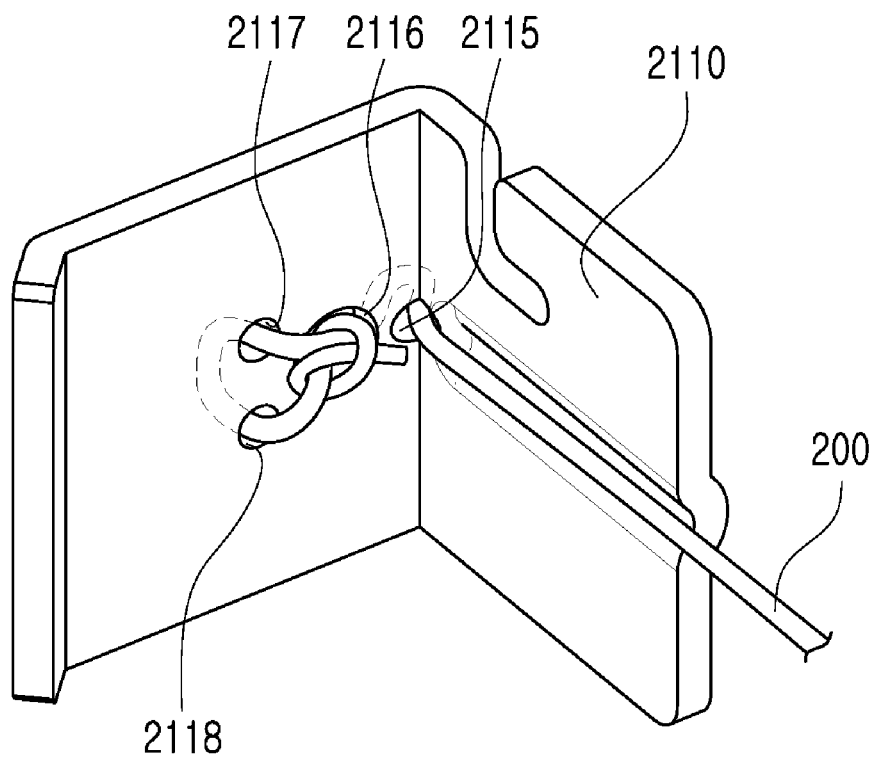
FIG. 10 is a view provided to explain a method of tying one end of the string to the hook according to an exemplary embodiment of the present disclosure.

FIG. 10 is a view provided to explain a method in which one end of the string is coupled to the hook part according to an exemplary embodiment of the present disclosure.

FIG. 10 illustrates an example in which one end of the string 200, which has passed through the hole 2115, is tied into a knot with the holes 2116, 2117, 2118 formed on the first plate 2111. Of course, different methods may be contemplated for coupling one end of the string 200 to the hook 2110.

Referring back to FIG. 9, the hook cover 2120 may be formed of an elastic polymer material such as rubber, silicone, and so on, and fit into the first plate 2111. The hook cover 2120 may provide advantageous effect for the design of the length measuring device 1, as it hides the knots of the string 200 with the holes 2116, 2117, 2118 formed on the first plate 2111. Further, increased grip force and friction force can be provided when the first plate 2111 is locked with the measured object, and accordingly, the hook part 210 can be fixed onto the measured object more stably.

Figure 11:
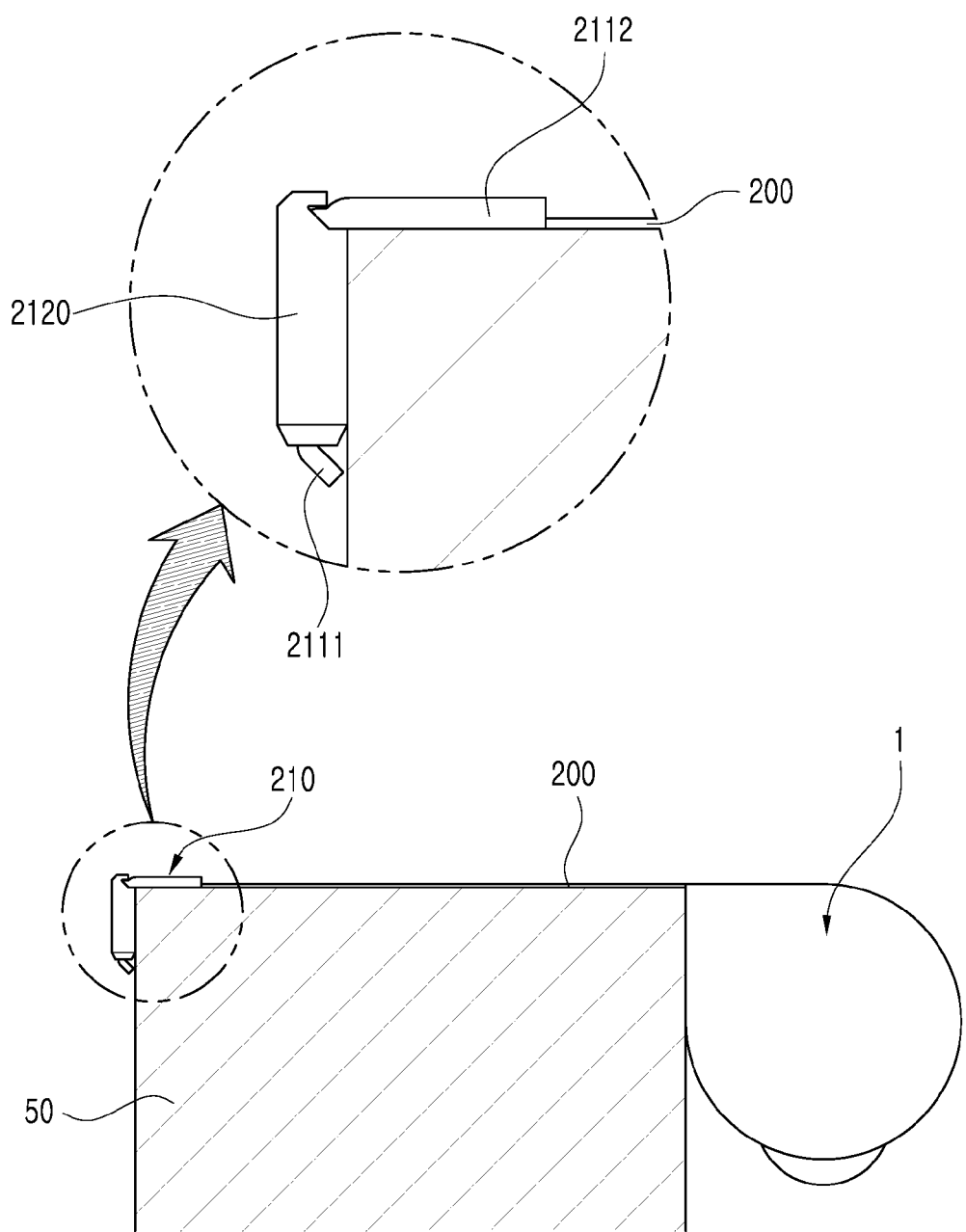
FIG. 11 is a view illustrating fixing the hook to a measured object and measuring lengths according to an exemplary embodiment of the present disclosure.

FIG. 11 is a view illustrating the hook part being fixed onto the measured object and length measuring is carried out, according to an exemplary embodiment of the present disclosure.

Referring to FIG. 11, in the string measuring mode, the operator may fix the hook part 210 onto a corner of the measured object 50, grips the length measuring device 1 in his or her hand and pulls it away, and measure the lengths.

At this time, the first plate 2111 is locked with the measured object 50, and the second plate 2112 is seated on the measured object 50.

The hook cover 2120 may increase the grip force and the friction force when the first plate 2111 is locked with the measured object. Further, the other end of the first plate 2111, which is exposed outside the hook cover 2120, may be bent toward the measured object 50, in which case the hook part 210 may be fixed on the measured object 50 more stably.

Referring back to FIG. 2, the circuit board 700 may include a display 711, a button portion 713, a non-contact measuring portion 720, a laser guiding portion 730, a first magnetic encoder 741, a second magnetic encoder 743, and so on, and may also have a variety of electrical elements necessary for the operation of the length measuring device 1.

Figure 12:
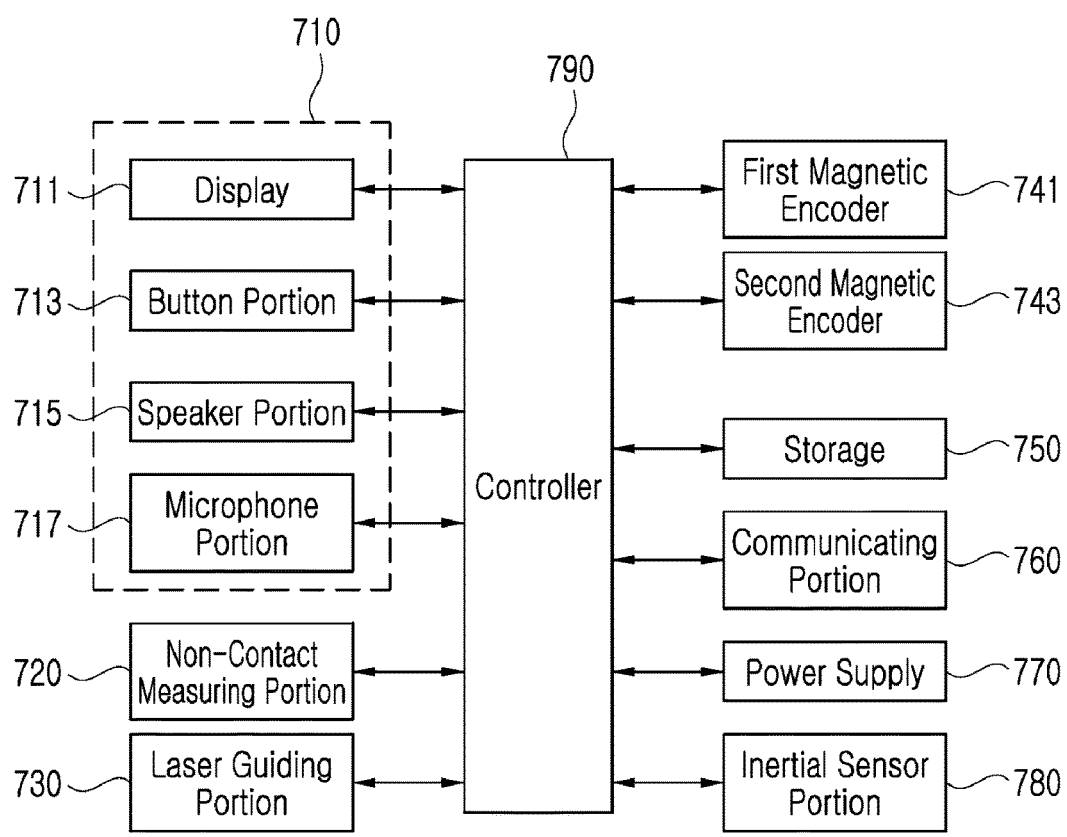
FIG. 12 is a block diagram illustrating electrical elements of a length measuring device according to an exemplary embodiment of the present disclosure.

FIG. 12 is a block diagram illustrating electrical elements of a length measuring device according to an exemplary embodiment of the present disclosure.

Referring to FIG. 12, the length measuring device 1 may include an input/output portion 710, a non-contact measuring portion 720, a laser guiding portion 730, a first magnetic encoder 741, a second magnetic encoder 743, a storage 750, a communicating portion 760, a power supply 770, an inertial sensor portion 780, and so on.

The input/output portion 710 may include all or some of the display 711, the button portion 713, the speaker portion 715, and the microphone portion 717.

The display 711 may perform a function of visually displaying information associated with the operation of the length measuring device 1, and to this purpose, the display 711 may be implemented as a display module such as LED, LCD, OLED, and so on. Specifically, the display 711 may display a length measurement obtained at the length measuring device 1, and also display information about the current operation mode.

The button portion 713 performs a function of receiving an input of commands associated with the operation of the length measuring device 1 from the user. Meanwhile, it is also possible that the button portion 713 is implemented so as to receive commands from the user through the first rotating part 500. In addition to being implemented as a mechanical structure, the button portion 713 may also be implemented as a touchpad, and so on, which can sense a contact on a corresponding location by the user's finger, and so on. The number or location of the button portions 713 may be varied according to exemplary embodiments.

The speaker portion 715 performs a function of outputting the information associated with the operation of the length measuring device 1 into sound. Specifically, the speaker 715 may output the information about the length measurement obtained at the length measuring device 1 or the current operation mode into voice, signal tone, and so on.

The microphone portion 717 may perform a function of receiving an input of commands or information associated with the operation of the length measuring device 1 in a form of voice from the user.

The non-contact measuring portion 720 may measure the time duration in which laser, infrared light or ultrasound is generated and then reflected against, and returned from the measured object. Based on the time measured at the non-contact measuring portion 720, the controller 790 may obtain a length measurement corresponding to a distance between the measured object and the length measuring device 1.

The laser guiding portion 730 may emit a laser to mark a guiding line on the measured object. The length measuring device 1 may be moved on the measured object according to the guide line to perform accurate length measuring.

The first magnetic encoder 741 may calculate an amount of rotation of the second rotating part 300 by detecting change in the magnetic field that is generated when the magnet 320 is rotated in accordance with the rotation of the second rotating part 300 during extension or retraction of the string 200.

The second magnetic encoder 743 may calculate an amount of rotation of the first rotating part 500 by detecting change in the magnetic field that is generated when the magnet 520 is rotated in accordance with the rotation of the first rotating part 500 upon contact with the measured object.

The method of the first magnetic encoder 741 and the second magnetic encoder 743 for calculating the amounts of rotation of the second rotating part 300 and the first rotating part 500 will be described in detail below.

The storage 750 may record information, data, and programs associated with the operation of the length measuring device 1 and provide the same upon request by the controller 790.

The communicating portion 760 may exchange information and data with an external device by a wired communication technique through the power data port 720 shown in FIG. 1. Of course, the length measuring device 1 may be provided with wireless communication which may enable exchange of information data with the external device. The wired communication may include communication technique that uses universal serial bus (USB) cable, and so on, and the wireless communication may include, for example, Wi-Fi, Bluetooth, Zigbee, Infrared Data Association (IrDA), Ultra Wideband (UWB) or Radio Frequency Identification (RFID), short range communication such as NFC, or mobile communication such as 3rd Generation (3G), 4th Generation (4G), or Long Term Evolution (LTE).

The power supply 197 performs a function of supplying power necessary for the operation of the respective elements of the length measuring device 1, and may be implemented as a battery. The power supply 197 may include a function of receiving external power through the power data port 720 and charging the battery.

The inertial sensor portion 780 may include at least one of an accelerometer, a gyro sensor, and a geomagnetic sensor, and may measure a motion or a posture of an object. Accordingly, the inertial sensor portion 780 may perform a function of measuring motions, postures, moving trajectories, and so on.

The controller 790 controls the overall operation of the length measuring device 1. Specifically, the controller 790 in the string measuring mode may convert the extent by which the string 200 is extended into a length measurement. Further, the controller 790 in the wheel measuring mode may convert an amount of rotation of the first rotating part 500 into a length measurement, or in the contactless mode, the controller 790 may convert the time duration in which the non-contact measuring portion 720 generates laser, infrared light, ultrasound, and so on and then receives back the reflected laser, infrared light, ultrasound, and so on, into a length measurement.

The controller 790 may display the length measurement through the display 711, or output the length measurement as a sound through the speaker portion 715. Further, the controller 790 may send the length measurement to an external device through the communicating portion 760.

The controller 790 may also be able to record the length measurement in the storage 750. The controller 790 may tag the voice information inputted from the user through the microphone portion 717 when storing the length measurement. When a word that can specify the measured object is applied as a tag to the length measurement, it becomes easy to check the length measurement of the corresponding measured object when necessary, and also becomes easy to manage a plurality of length measurement data.

In a preferable example, using a voice text recognition program, the controller 790 may automatically change the tag information inputted by the voices of the user into texts, and tag the changed information to the length measurement and store the same. Meanwhile, the controller 790 may send both the length measurement and the tag information of the corresponding length measurement to an external device. Of course, an implementation is also possible, in which the tag information is stored as voices and converted into texts at the external device.

Figure 13:
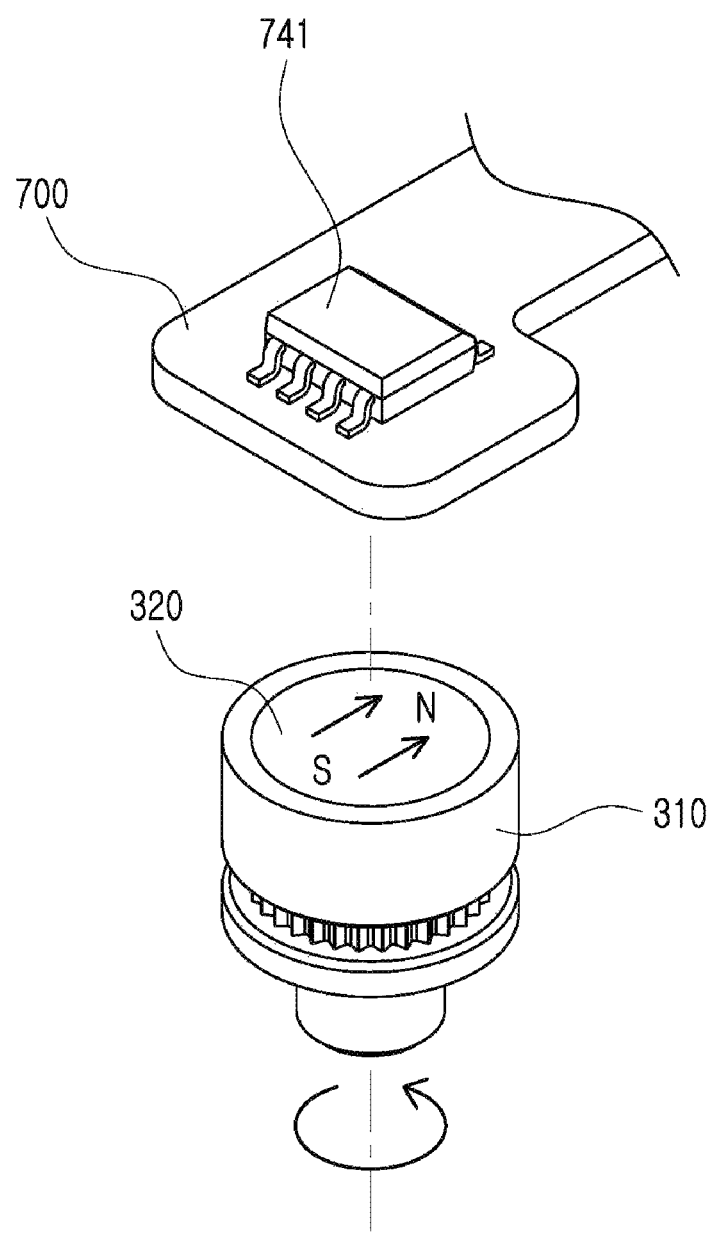
FIG. 13 is a view provided to explain a method for detecting an amount of rotation of a second rotating part according to an exemplary embodiment of the present disclosure.

FIG. 13 is a view provided to explain a method for detecting an amount of rotation of a second rotating part according to an exemplary embodiment of the present disclosure.

Referring to FIG. 13, the first magnetic encoder 741 may be mounted on the circuit board 700 and above the second rotating part 300 to sense the magnetism emitted from the magnet 320. Further, as described above, the magnet 320 is magnetized to one of perpendicular directions with respect to the axis of rotation of the second rotating part 300. Accordingly, by sensing the magnetic field changing as the magnet 320 fixedly inserted into the second rotator 310 is rotated, the first magnetic encoder 741 may calculate the amount of rotation of the second rotating part 300.

Likewise the first magnetic encoder 741, the second magnetic encoder 743 may also calculate the amount of rotation of the first rotating part 500.

Meanwhile, with the structure described above, the length measuring device 1 according to the present disclosure can be easily assembled in the order described below. First, the second rotating part 300, the first rotating part 500, the rotating drum part 400, the guiding part 600, and so on are mounted on the lower case 110. Then the circuit board 700, which has electrical elements, and so on mounted thereon, is mounted on the lower case 110. Lastly, the upper case 120 is coupled with the lower case 110.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:
1. A length measuring device, comprising:
a case;

a first rotating part configured to rotate while a portion of a circumference thereof exposed outside the case is in contact with a measured object;

a rotation interfering part configured to interfere with an inertial rotation of the first rotating part; and a control part configured to calculate a length measurement using an amount of rotation of the first rotating part.

2. The length measuring device of claim 1, wherein the first rotating part comprises a rotator, wherein the rotator comprises: a groove to receive the rotation interfering part; and a bump formed on an inner wall of the groove, and the rotation interfering part comprises one or more interfering protrusions configured to contact the bump formed on the inner wall of the groove to interfere with the inertial rotation of the first rotating part.

3. The length measuring device of claim 2, wherein the bump formed on the inner wall of the groove has a serrated structure and is formed of an elastic material.

4. The length measuring device of claim 3, wherein the rotator comprises a projecting part, wherein the projecting part has a magnet insertion groove to receive a magnet inserted therein, the groove is formed along a circumference of the projecting part, the interfering protrusion is formed on a side surface of the rotation interfering part, and a hole is formed at a center of the rotation interfering part so that the magnet and the projecting part do not contact the rotation interfering part.

5. The length measuring device of claim 1, further comprising:

a rotating drum part, along which a string is wound a plurality of times, and which is rotated as the string is retracted or extended into or out of an outlet formed in the case;

a second rotating part of which a circumference is in contact with the string, and which rotates in accordance with the retracting or extension of the string; and a guiding part configured to guide the string to be retracted or extended while a portion of the string is in contact with the circumference of the second rotating part.

6. The length measuring device of claim 5, wherein the guiding part comprises a plurality of pins for bringing the portion of the string into a close contact with the circumference of the second rotating part, the plurality of pins are spaced apart from the second rotating part, and the string is passed between the second rotating part and the plurality of pins.

7. The length measuring device of claim 6, wherein the plurality of pins comprise a first pin and a second pin, the first pin, a center of the second rotating part, and the second pin form an obtuse angle, and the string is brought into a contact with a portion of the circumference of the second rotating part that is in an opposite direction to the obtuse angle.

8. The length measuring device of claim 6, wherein the guiding part further comprises a guide body comprising:

a second rotating part insert into which the second rotating part is rotatably inserted; and a plurality of pin inserts into which the plurality of pins are respectively inserted.

9. The length measuring device of claim 8, wherein an upper portion of the guide body is open to allow the second rotating part and the plurality of pins to be inserted into the guide body from above the guide body.

10. The length measuring device of claim 9, further comprising a stopper coupled with the upper portion of the guide body so that the string is prevented from separating from inside of the guide body through the upper portion of the guide body.

11. The length measuring device of claim 9, wherein the case comprises an upper case and a lower case, and the guide body comprises a fitting coupler formed on a lower portion to be fit in the lower case.

12. The length measuring device of claim 5, further comprising:

a first magnet fixed to an end of the second rotating part;

a first magnetic encoder configured to calculate an amount of rotation of the second rotating part by detecting a change in a magnetic field generated by a rotation of the first magnet when the second rotating part is rotated according to extension or retraction of the string; and a controller configured to calculate a length measurement using the amount of rotation of the second rotating part.

13. The length measuring device of claim 12, wherein the second rotating part comprises a guiding groove formed in the circumference thereof to guide the string.

14. The length measuring device of claim 13, wherein the guiding groove comprises bumps formed along a circumference thereof.

15. The length measuring device of claim 13, wherein the first magnet has a cylindrical shape, and the first magnet is a permanent magnet magnetized in one of perpendicular directions with respect to an axis of rotation of the second rotating part.

16. The length measuring device of claim 12, further comprising:

a second magnet fixed to an end of the first rotating part; and a second magnetic encoder configured to calculate an amount of rotation of the first rotating part by detecting a change in a magnetic field generated by a rotation of the second magnet when the first rotating part is rotated, wherein the controller calculates length measurement by using the amount of rotation of the second rotating part, or the amount of rotation of the first rotating part.

17. The length measuring device of claim 16, further comprising a circuit board having the first magnetic encoder and the second magnetic encoder mounted thereon, wherein the case comprises an upper case and a lower case, the rotating drum part, the second rotating part, and the first rotating part are mounted on the lower case, and when the lower case and the circuit board are coupled, the first magnetic encoder and the second magnetic encoder are disposed above the second rotating part and the first rotating part, respectively.

18. The length measuring device of claim 1, further comprising a hook part coupled to one end of the string, wherein the hook part comprises a first plate and a second plate, the second plate is connected to one end of the first plate at a predetermined angle, and the second plate comprises an elongated groove formed in a direction extending from the first plate.

19. The length measuring device of claim 18, wherein, when the hook part is fixed onto the measured object, a portion of the string is inserted into the elongated groove such that movement of the string is restricted within a width and a depth of the elongated groove.

20. The length measuring device of claim 18, wherein one end of the string is passed through a hole formed at a center of a connecting part between the first plate and the second plate and tied into a knot on the first plate.

* * * * *